May 4, 1965            E. F. HUSTON            3,181,722

ELECTRICAL APPARATUS HOUSING AND JOINT THEREFOR

Filed July 12, 1960

INVENTOR.
ELMO F. HUSTON
BY
ATTORNEY

United States Patent Office 3,181,722
Patented May 4, 1965

3,181,722
ELECTRICAL APPARATUS HOUSING AND JOINT THEREFOR
Elmo F. Huston, Akron, Ohio, assignor to The Ohio Brass Company, Mansfield, Ohio, a corporation of New Jersey
Filed July 12, 1960, Ser. No. 42,410
8 Claims. (Cl. 220—2.3)

This application is a continuation-in-part of application Serial No. 742,777, filed June 18, 1958, and now abandoned, and claims subject matter disclosed in application Serial No. 8,812, filed February 15, 1960, and now Patent No. 3,104,278.

This invention relates to electrical apparatus housings and more particularly to electrical apparatus housings in which a fluid tight enclosure is constituted by ceramic and metal parts.

A general object of the invention is to provide a fluid tight and pressure resistant enclosure incorporating ceramic and metal parts.

A specific object of the invention is to connect a tubular ceramic member and a metal plate, arranged across the end of the ceramic member to close the interior of the ceramic member, and to maintain a seal between the two parts.

Another general object of the invention is to increase the strength, durability and length of life of bushings, potheads, insulators and the like.

In bushings, potheads and other like through and terminating devices, a metallic conductor is utilized for transmitting electrical energy from one functional device or apparatus to another, the latter usually a conductor or lead. The conductor is insulated from the associated elements, or parts of the device by various insulating means and, where the device is to be used at high voltages, the insulating means includes a tubular ceramic member which constitutes all, or a part, of a housing for the device. The interior of the housing is filled with oil or gas to provide a seal-healing, insulating medium, of high dielectric strength.

In such devices, the connection between the ceramic member and associated parts of the housing must retain the insulating medium at high pressure and over a wide range of temperature. It has heretofore been the practice to make that connection by means of a joint which includes an annular flange which surrounds and is cemented to the end of the ceramic member. The flange is bolted to the end plate and an annular gasket is inserted between the end plate and the abutting face of the ceramic member in order to provide a fluid tight seal. Such arrangements, and variants thereof, are widely used, although subject to certain limitations as to the durability of the joint and life of the seal.

The present invention relates to an improved joint and closure for ceramic and metal housing and end parts utilized in potheads and bushings. The electrical apparatus housing of the invention incorporates a tubular ceramic member, an end plate, and a clamping arrangement between the end plate and the exterior of the ceramic member. The end plate has a portion thereof radially within the end of the wall of the ceramic member constituted as a bearing member, in the form of an integral ring, which extends beyond the face of the remainder of the plate such that the end face of the ceramic member bears against the outer surface of the ring. Two O-rings are received in grooves at the inside and outside of the bearing ring and engage the end face of the ceramic member to seal the joint. In another embodiment of the invention, the bearing ring is separate from the end plate and the end plate is formed with a single groove having a radial extent sufficient to accommodate the bearing ring and two O-rings.

The bearing ring and groove are so dimensioned that the ring is loaded in the longitudinal direction by the ceramic member so as to receive all, or a large part, of the compressive force exerted between the end of the ceramic member and the end plate. The bearing ring is loaded within the elastic limit of the material so that the separating force provided between the end plate and the end of the ceramic member is maintained during the life of the bushing.

The invention will be more fully understood by reference to the following detailed specification and claims taken in connection with the appended drawings, in which:

Figure 1:
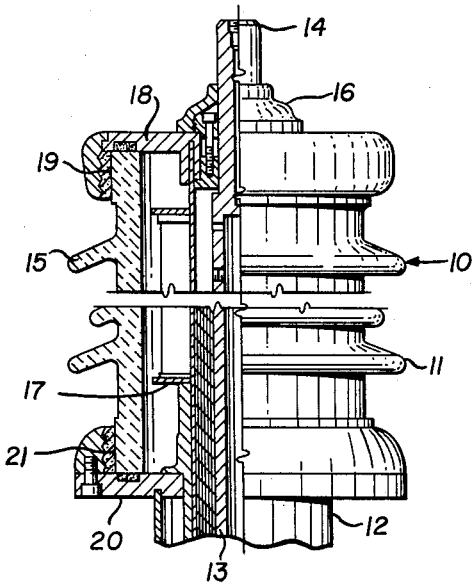
FIG. 1 is a partial view of a pothead embodying the invention.

Referring now to FIG. 1, a pothead 10 is illustrative of electric apparatus embodying the electrical apparatus housing of the invention. The pothead 10 comprises an electric apparatus housing, designated generally at 11, a base 12, conductor 13 and terminal 14. The apparatus housing 11 includes a tubular ceramic member 15 which is carried upon the base 12, supports certain terminal apparatus 16, and encloses certain grading and control apparatus 17 associated with the conductor 13. The parts 12, 13, 14, 16 and 17 pertain to the pothead 10 and are not a necessary part of the apparatus housing of the invention.

The tubular ceramic member 15 supports an upper end plate 18 which extends across the end of the ceramic member and is connected to the ceramic member by means of a joint 19, as hereinafter described in connection with FIGS. 2 and 3. The upper end plate 18 supports and holds the terminal apparatus 16 for carrying the terminal 14 in fluid sealed relation to the end plate 18 while permitting relative longitudinal movement of the terminal 14 with respect to the end plate. This structure accommodates differences in change of length of the parts due to the different temperature characteristics of the ceramic member 15 and the conductor 13 and the terminal 14.

At the lower end of the housing 11, the tubular ceramic member 15 is supported by a lower end plate 20 which extends across the end of the ceramic member and is connected to the ceramic member by means of a joint 21 as hereinafter described in connection with FIGS. 2 and 3. The lower end plate 20 is supported by and attached to the base 12 and carries a coaxial support for the apparatus 17 and the conductor 13. The base 12 is provided with means (not shown) for attachment to the sheath of the conductor 13.

Figures 2, 3:
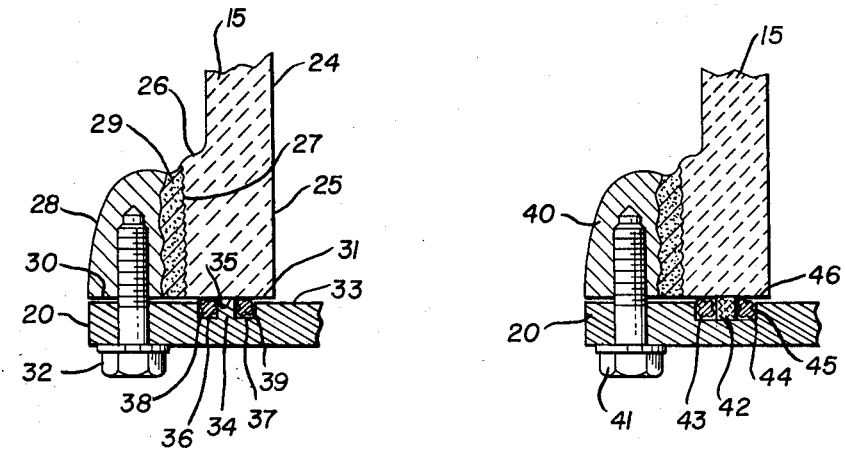
FIG. 2 is an enlarged section view of a portion of the pothead in FIG. 1, and illustrating the joint of the invention; and, FIG. 3 is a section view of another embodiment of the invention.

Referring now to FIG. 2, the one embodiment of the invention is shown for the disposition of parts of the joint 21 at the lower end of the housing 11 in FIG. 1. Thus, the wall 24 of the member 15 has the end part 25 formed with a shoulder 26 to carry flange means and to increase the thickness and the strength of the wall. The shoulder 26 has a sanded exterior surface, indicated generally at 27. A flange 28 is bonded to the shoulder 26 of the member 15 by a body of cement 29 which extends between the interior surface of the flange 28 and the sanded surface 27. The shoulder 26, the flange 28 and the body of cement 29 extend peripherally about the wall 24 of the ceramic member 15 and the end face 30 of the flange 28 is flush with the end face 31 of the ceramic member. The end face 31 has a smooth ground finish and is perpendicular to the longitudinal axis of the ceramic member 15.

The end plate 20 is secured to the flange 28 by means of a set screw 32 which is received through an opening in the end plate and is threaded into an opening in the flange 28. In accordance with the invention, a seal and stop arrangement is provided for transmitting the forces exerted between the end plate 20 and the wall 24 of the housing 15 and for sealing the space between the end face 31 of the ceramic member 15 and the adjoining face 33 of the end plate 20.

The end plate 20 is constructed with a bearing ring 34 which extends circumferentially of the end plate such that the ring engages the face 31 of the member 15 centrally between the interior surface of the wall 24 and the exterior surface of the shoulder 26 about the entire periphery of the member. The ring 34 is formed as an integral part of the plate 20 and extends above the level of the face 33 of the plate so that, in the lightly loaded or unloaded condition of the parts, only the face 35 of the ring engages the face 31 of the member 15. The elevation of the face 35 of the ring with respect to the face 33 of the end plate is such that the ring is loaded elastically within the range of movement of the ceramic member with respect to the end plate 20. Moreover the radial extent of the ring is such that a predetermined portion of the force between the parts is transmitted to the end plate by the ring 34, while the remainder of the force is transmitted to the end plate by engagement of the interior portion of the wall 24 and exterior portion of the shoulder 26 with the face 33 of the end plate adjacent the grooves 36 and 37 in the end plate.

The elevation of the bearing ring 34 with respect to the face 33 of the end plate 20 determines, of course, the proportion of the load which is transmitted to the end plate through the bearing ring. The actual division of load is not determinable in the device itself and the principal criteria relates to freedom of cracking and chipping at the corners at the end of the ceramic member. In one embodiment of the invention, in which the outside diameter of the bearing ring was 11 inches, the depth .22 inch, and the radial thickness 1.15 inches, the bearing face 35 was .005 inch above the face 33 of a stainless steel end plate. The elevation of the bearing ring will vary with the circumstances of a particular design, generally between .003 and .015 inch in the usual sizes of equipment and apparatus.

Two O-rings 38 and 39 are received within the grooves 36 and 37 and are compressively engaged with the face 31 of the member 15 and with the surfaces of the respective grooves. The O-rings accommodate variations in the adjoining surfaces of the member 15 and the ring 34 with the ring 38 sealing the joint during evacuation of the housing and the ring 39 sealing the joint when the housing is filled with fluid dielectric medium at high pressure. The rings 38 and 39 illustrated in the drawing are a species of O-ring commonly known as quad-rings in which the body of the seal is formed with separate rounded contacting portions at opposed apices. Quad-rings have certain advantages for use with ceramic materials; particularly, a more effective seal is provided at the surface of the ceramic part.

It is a feature of the present invention that the life of the O-rings 36 and 37 is greatly increased as compared with prior arrangements. Cyclical compression and relaxation of the O-rings is minimized and hardening of the O-rings and consequent loss of sealing properties is avoided.

In the embodiment of FIG. 3, the tubular ceramic member 15 is connected to the end plate 20 by means of a flange 40 and set screw 41 as in the joint of FIG. 2. However, the seal and stop arrangement of FIG. 3 differs from that of FIG. 2 in that the bearing ring 42 is separate from the end plate 20 and is received, with the two O-rings 43 and 44, in a groove 45 formed in the side of the plate 20 adjoining the end face 46 of the ceramic member 15. Inasmuch as the bearing ring 42 is separate from the end plate 20, a material may be selected, suitable to the particular load and dimensions of the apparatus. Impregnated fibrous materials such as phenolic canvas, phenolic paper, or certain metals such as copper have good sealing characteristics in conjunction with the member 15.

While it is desirable that the bearing ring be loaded elastically, as set forth in connection with FIG. 2, it is to be understood that loads slightly in excess of the elastic limit at the greatest compression, i.e., when the ceramic member is engaged with the end plate, are useful and within the scope of the invention. Dimensional stability is an important consideration in the selection of a material for the ring. Otherwise, under conditions of plastic creep, the bearing ring unloads and all of the compressive force is exerted directly between the ceramic member 15 and the end plate 20. Again, there is a considerable range of spacing useful in the practice of the invention and the initial difference between the face of the stop ring and the face of the end plate may vary between .003 and .015 inch depending upon the material and load imposed.

In the two embodiments of the invention, the overall force exerted between the end plate and the ceramic member, may be controlled by inserting shims between the end plate 20 and the flange 28 or the flange 40.

It is to be understood that the foregoing description is not intended to restrict the scope of the invention and that various rearrangements of the parts and modifications of the design may be resorted to. The following claims are directed to combinations of elements which embody the invention or inventions of this application.

I claim:

1. In a housing assembly comprising a tubular ceramic member having a face at one end thereof, a metal end plate arranged across the said end of the ceramic member, and means drawing the end plate against the said face, means between the end plate and the end face of the ceramic member comprising a bearing ring of rigid material engaged with the radially central portion of the said face of the ceramic member about the circumference thereof, the said bearing ring acting upon the end plate below the face thereof and normally projecting above the face thereof such that a substantial portion of the compressive force exerted by the drawing means is transmitted between the ceramic member and the end plate by elastic deformation of the said bearing ring, and the remaining portion of the compressive force being transmitted from the ceramic member to the end plate by contact therewith adjacent the bearing ring.

2. The invention in accordance with claim 1 with a groove adjacent the said ring, an O-ring received in the groove compressively engaged with the face of the ceramic member and with the end plate, the said end plate closing the interior of the ceramic member and constituting a fluid-sealed pressure-tight enclosure.

3. The invention in accordance with claim 1 in which the bearing ring is integral with the end plate.

4. The invention in accordance with claim 1 in which the bearing ring is separate from the end plate and is received in a groove therein.

5. A housing assembly for electrical apparatus comprising a tubular ceramic member having a face at one end thereof, a metal end plate arranged across the said end of the ceramic member and closing the interior thereof, flange means extending peripherally about the ceramic member and fixed thereto, fastener means between the end plate and the flange means for drawing the end plate against the said face, and a bearing ring between the end plate and the end face of the ceramic member comprising an annular piece of rigid material engaged with the radially central portion of the said face of the ceramic member about the circumference thereof and a groove at the outside and a groove at the inside of the annular piece, the said bearing ring normally projecting above the face of the end plate such that a portion of the compressive force exerted by the fastener means is transmitted between the ceramic member and the end plate by elastic deformation of the said bearing ring, and the portions of the end plate defining the exterior of the outside groove and the interior of the inside groove being disposed radially within the exterior and interior extremities of the face of the ceramic member for transmitting the remainder of the said compressive force between the said ceramic member and the end plate.

6. In combination, a generally tubular member of frangible material, a second member having an annular face thereof in axial alignment with the wall of the tubular member and with an end face thereof, means compressing the second member against the end face of the frangible member, and means comprising a bearing ring of rigid material elastically compressed between the two members, the said bearing ring acting upon at least one of the members below the face thereof such that a substantial part of the compressive force between the frangible member and the second member is transmitted between the frangible member and the second member in part by separate elastic deformation of the bearing ring and the remaining part of the compressive force is transmitted by direct engagement of the frangible member with the second member at the engaging faces thereof.

7. In a housing assembly comprising a tubular ceramic member having a face at one end thereof, a metal end plate arranged across the said end of the ceramic member, and means drawing the end plate against the said face, means between the end plate and the face of the ceramic member comprising a bearing ring of rigid material engaged with the radially central portion of the said face of the ceramic member about the circumference thereof, the said bearing ring acting upon the end plate below the face and normally projecting above the face thereof, such that a substantial portion of the compressive force exerted by the drawing means is transmitted between the ceramic member and the end plate by elastic deformation of the said bearing ring, and the bearing ring and two O-rings, one interiorly of the bearing ring and one exteriorly of the bearing ring, disposed in a circumferential groove having a radial extent less than the radial thickness of the ceramic member at the end face thereof, for transmitting the remaining portion of the compressive force by engagement of the ceramic member with the end plate interiorly of and exteriorly of the groove.

8. In a joint between two structural members, a groove in at least one of the members opposed to an adjacent face of the remaining one of the said two members and having an extent less than that of said remaining one member, such that the two members are brought into contacting relation adjacent the two sides of the groove by compressive force exerted upon the said two members, means comprising a resilient member of rigid material in the groove and bearing upon the said one member at the bottom of the groove and bearing upon the remaining one of the said two members at the adjacent face thereof and so dimensioned in relation to the groove that the resilient member is compressively deformed substantially within the elastic range of the material of the said resilient member and transmits a substantial part of the compressive force between the two members with the remaining part of the compressive force transmitted from one of the said two members to the other at the contacting portions thereof, and a sealing member of deformable material in the groove on one side of the resilient member and a second sealing member in the groove on the remaining side of the resilient member, each engaged with the surfaces of the said two members.

References Cited by the Examiner

UNITED STATES PATENTS

| | | | |
|---|---|---|---|
| Re. 24,329 | 6/57 | Booth | 220—46 |
| 2,289,164 | 7/42 | Arnold et al. | 285—368 |
| 2,613,845 | 10/52 | Swerdlow et al. | 220—46 |
| 2,650,259 | 8/53 | Marks | 285—368 |
| 2,657,825 | 11/53 | Erickson | 220—46 |
| 2,772,019 | 11/56 | Jones | 220—89 |
| 2,772,807 | 12/56 | Booth | 220—46 |
| 2,828,625 | 4/58 | Morphis et al. | 220—82 |
| 2,873,132 | 2/59 | Tanner | 288—19 |
| 2,922,542 | 1/60 | Barr | 220—46 |
| 2,989,209 | 6/61 | Hersman | 220—46 |
| 3,018,090 | 1/62 | Kaase et al. | 220—46 |
| 3,079,033 | 2/63 | Wooton | 220—46 |

FOREIGN PATENTS

| | | |
|---|---|---|
| 657,168 | 1/29 | France. |
| 753,641 | 7/56 | Great Britain. |

THERON E. CONDON, *Primary Examiner.*

CARL W. TOMLIN, *Examiner.*